(12) United States Patent
Chatterjee et al.

(10) Patent No.: US 9,213,997 B2
(45) Date of Patent: Dec. 15, 2015

(54) METHOD AND SYSTEM FOR SOCIAL MEDIA BURST CLASSIFICATIONS

(71) Applicant: METAVANA, INC., Menlo Park, CA (US)

(72) Inventors: Manjirnath Chatterjee, San Francisco, CA (US); Rabia Turan, Redwood Shores, CA (US); Brian Lue, Mountain View, CA (US)

(73) Assignee: MOODWIRE, INC., Menlo Park, CA (US)

( * ) Notice: Subject to any disclaimer, the term of this patent is extended or adjusted under 35 U.S.C. 154(b) by 301 days.

(21) Appl. No.: 14/062,746

(22) Filed: Oct. 24, 2013

(65) Prior Publication Data

US 2014/0114978 A1    Apr. 24, 2014

Related U.S. Application Data

(60) Provisional application No. 61/717,890, filed on Oct. 24, 2012.

(51) Int. Cl.
*G06F 17/30* (2006.01)
*G06Q 50/00* (2012.01)
*G06Q 10/10* (2012.01)

(52) U.S. Cl.
CPC .............. *G06Q 50/01* (2013.01); *G06Q 10/107* (2013.01)

(58) Field of Classification Search
CPC .......... G06F 17/30864; G06F 17/3071; G06F 17/30598
USPC .......................................... 707/737, 748, 754
See application file for complete search history.

(56) References Cited

U.S. PATENT DOCUMENTS

| | | | |
|---|---|---|---|
| 7,788,087 B2 | 8/2010 | Corston-Oliver et al. | |
| 2004/0139072 A1 | 7/2004 | Broder et al. | |
| 2005/0108384 A1 | 5/2005 | Lambert et al. | |
| 2006/0085248 A1* | 4/2006 | Arnett ..................... | G06F 21/31 705/7.31 |
| 2010/0070485 A1 | 3/2010 | Parsons et al. | |

OTHER PUBLICATIONS

Yao et al, Temporal and Social Context based Burst Detection from Folksonomies, Copyright 2010, Association for the Advancement of Artificial Intelligence, 6 pages.*

(Continued)

*Primary Examiner* — Rehana Perveen
*Assistant Examiner* — Loc Tran
(74) *Attorney, Agent, or Firm* — Dentons US LLP

(57) ABSTRACT

The present invention is directed to a method, system, and article of manufacture for systematically and automatically identifying abnormal or collective behavior patterns in microblogging messages that produce burst phenomena, such as Twitter storms. A microblogging storm engine in a storm detection server is configured to detect and classify the volume, shape, and type of a Twitter storm when keying on topics such as, but not limited to, a brand, an event, a person, an entity, a country, or a controversial issue. The microblogging storm engine comprises a storm detection module, a storm classification module, a database interface module, and a sentiment process module. The storm detection module is configured to detect different patterns of microblogging storms by capturing the volume of a particular storm to assist in output statistical analysis. The storm classification module is configured to classify the storms into different types of a particular storm category.

16 Claims, 11 Drawing Sheets

(56) References Cited

OTHER PUBLICATIONS

Metavana, Inc. et al.; PCT/US2013/066706 filed on Oct. 24, 2013; Notification of Transmittal of International Search Report and the Written Opinion of the International Searching Authority mailed on Feb. 19, 2014; International Application Division, Korean Intellectual Property Office; 13 pages.

* cited by examiner

METHOD AND SYSTEM FOR SOCIAL MEDIA BURST CLASSIFICATIONS

CROSS REFERENCE TO RELATED PATENT APPLICATIONS

This application claims priority to U.S. Provisional Application Ser. No. 61/717,890 entitled "Social Media Burst Statistical Classification System," filed on 24 Oct. 2012, the disclosure of which is hereby incorporated by reference in its entirety into the present patent application.

TECHNICAL FIELD

The present invention relates generally to social media and microblogging, and more particularly to statistical machines for natural language understanding of expressed human sentiments and analysis of an enormous amount of data from social media.

BACKGROUND ART

Online social networking and microblogging services, such as Twitter, enable their users to send and receive short messages, which include text, audios, images and videos, to a recipient or a group of recipients. In one instance, in the case of Twitter, the short messages are text-based messages of up to 140 characters, which are commonly known as "tweets." A user can type a tweet via a mobile device or a computer and send the tweet to a Twitter server, which relays the tweet to a list of other users (known as followers) who have signed up to receive the sender's tweets either by text message to their mobile phones or by instant message. In another form of microblogging service, Tencent offers WeChat, which provides multimedia communication messaging including text messaging, hold-to-talk voice messaging, broadcast (one-to-many) messaging, photo/video sharing, location sharing, and contact information exchange.

Twitter storms are phenomena where social media analytic entities can be flooded with frequently recurring items. Some of the messages may be viewed as "noise," where the same message is tweeted or re-tweeted at a much higher frequency than usual, or the messages can act as a "signal" that people genuinely want to express their feelings about some topic, which has a real sentiment-magnitude. While first discovered in Twitter, statistically this type of phenomenon can occur in many social media settings, such as Google+ streams, Facebook, Sina Weibo, and Tencent WeChat.

One key practical issue that arises from Twitter storms is the flood of input data stream into a search engine, which may have the effect of drowning out useful information or creating problems with how to weight the storm. Even if a Twitter storm is detected, other key issues remain as to what to with the storm data. If the Twitter storm appears to be noise, should the tweets be removed? For a Twitter storm, there is a question as how to weigh the signal from the storm in the final analysis of sentiment-magnitude. As an example, if a re-tweeted event is identical but deemed a signal and re-tweeted 10,000 times, the tweet may be treated as "1" event since the information is the same, or the tweet could be given a weighted output (e.g., 10,000×) because the re-tweeting is relevant in terms of magnitude.

In a conventional solution, a Google Scholar search on "Twitter spam detection" returns over 300 academic publications since 2008, whereas a search on Twitter storm returns around 30 different publications. Many of the prior publications returned as a result to the "Twitter storm" query are primarily social studies that study the after-effect or the dissemination of the storm (Chadwick 2011, Rubbison 2012). Kim et al., 2012, studies the Twitter storm problem as the classification problem. The study classifies the storm into two categories: (a) opinion-bearing storms and (2) fact storms. The findings are that, with fact storms (which are along the line commonly referred to as news) the tweets barely contain the title of the news and a link to the news, whereas opinion-bearing Twitter storms are identified by the sentiment along with the repeating phrases related to the storm. This publication used Linguistic Inquiry and Word Count (LIWC) tool to identify sentiment in tweets. The group also studied the dissemination of Twitter storm. However, their opinion does not identify Twitter storms, but rather they did an after-study of a known event to analyze the characteristics of a storm, which attempted to answer three questions: (1) What are the temporal and spatial diffusion characteristics in the spread of corporate bad news? (2) How does the network structure determine the reactions of socially connected users? (3) What kinds of negative and positive sentiments are portrayed in Twitter conversations?

Social media are subject to "storms" of data in which news, certain social media phenomena such as jokes or spam, appear suddenly. This can present challenges for text mining data applications such as brand and product sentiment measurement where the burst phenomena overwhelm the legitimate expression of product sentiment. Accordingly, it is desirable to have a system and method that automatically detect and classify the microblogging burst phenomena.

SUMMARY OF THE INVENTION

A method, system, and article of manufacture are described for systematically and automatically identifying abnormal or collective behavior patterns in microblogging messages that produce burst phenomena, such as Twitter storms. A microblogging storm engine in a storm detection server is configured to detect and classify the volume, shape, and type of a Twitter storm when keying on topics such as, but not limited to, a brand, an event, a person, an entity, a country, or a controversial issue. The microblogging storm engine comprises a storm detection module, a storm classification module, a database interface module, and a sentiment process module. The storm detection module is configured to detect different patterns of microblogging storms by capturing the volume of a particular storm to assist in output statistical analysis. The storm classification module is configured to classify the storms into different types of a particular storm category.

Broadly stated, a computer-implemented method for analyzing social media events, comprising gathering a plurality of social media data received from one or more social media sources, each social media data including a post; extracting one or more features associated with each social media data; identifying substantially similar features among the plurality of social media data; clustering the plurality of social media posts that share substantially similar features, thereby identifying one or more clustered feature patterns; and detecting a burst of clustered social media posts that have similar characteristics, wherein the characteristics of each social media post are determined by the composition of the associated features Advantageously, the present invention provides the ability to automatically catch and classify certain types of social media burst behavior without human intervention. Previous systems such as spam filters can intercept numerous noisy (unrelated to the topic) posts but they cannot classify the noisy bursts as having a certain shape, magnitude, and classification (news vs. correlated-but-not-spam) information on the based topic domain and present that as an analytic state statistic versus time. Moreover, the present invention is able to distinguish between spam posts, relevant data (e.g., news), and correlated but not spam posts. This is valuable to businesses, customers, and government agencies for several reasons. First, the data presented is better categorized and noise free. Second, the posts identified as news are used to derive insights and manage customer expectations and take instant actions to preserve a company's public image. Third, classification of the posts in this way provides not only business customers but also consumers a better brand awareness. It will help consumers to make educated decisions in their next level service/product purchase. Fourth, identifying relevant but not spam tweets like "A Dell rolling in the deep" can help marketing departments to spot a trend as well as contributing to the composition in defining the next marketing campaign.

The structures and methods of the present invention are disclosed in the detailed description below. This summary does not purport to define the invention. The invention is defined by the claims. These and other embodiments, features, aspects, and advantages of the invention will become better understood with regard to the following description, appended claims, and accompanying drawings.

BRIEF DESCRIPTION OF THE DRAWINGS

The invention will be described with respect to specific embodiments thereof, and reference will be made to the drawings, in which.

DETAILED DESCRIPTION

Figure 1:
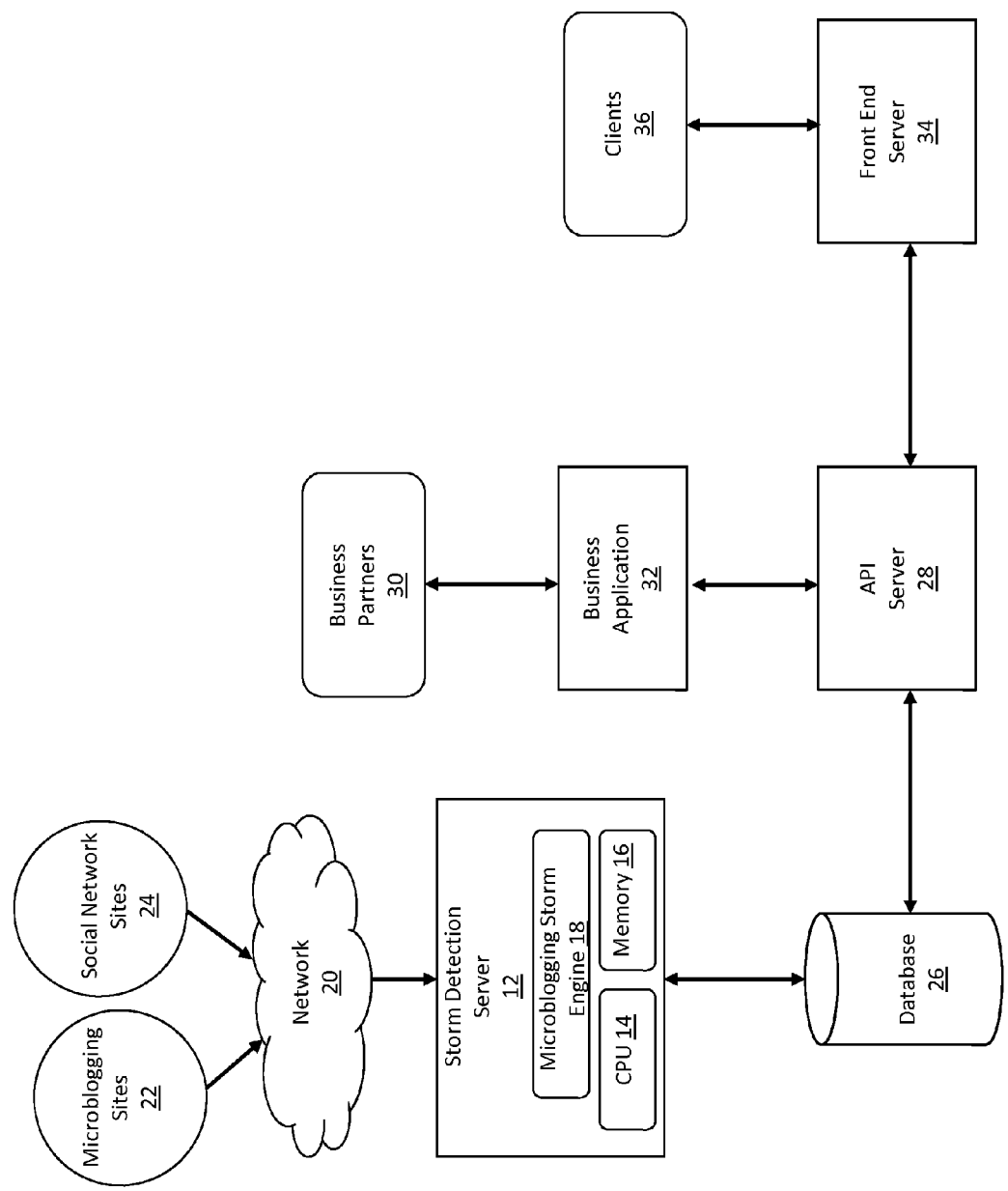
FIG. 1 is a system diagram illustrating the detection and classification of Twitter storms in accordance with the present invention.

A description of structural embodiments and methods of the present invention is provided with reference to FIGS. 1-10. It is to be understood that there is no intention to limit the invention to the specifically disclosed embodiments, but that the invention may be practiced using other features, elements, methods, and embodiments. Like elements in various embodiments are commonly referred to with like reference numerals.

The following definitions may apply to some of the elements described with regard to some embodiments of the invention. These terms may likewise be expanded upon herein.

Cloud Computing—Internet-based computing network that involves the provision of dynamically scalable and often virtualized resources as a service over the Internet, such as iCloud® available from Apple Inc. of Cupertino, Calif., Amazon Web Services (IaaS) and Elastic Compute Cloud (EC2) available from Amazon.com, Inc. of Seattle, Wash., SaaS and PaaS available from Google Inc. of Mountain View, Calif., Microsoft Azure Service Platform (Paas) available from Microsoft Corporation of Redmond, Wash., Sun Open Cloud Platform available from Oracle Corporation of Redwood City, Calif., and other cloud computing service providers.

Electronic Message Sharing Systems—include Internet forums, electronic mailing lists, blogs and microblogs, and social networks.

Mobile Device—a portable device (including a smartphone iPhone, a mobile phone, a mobile device such as iPod, a tablet computer such as iPad, and a browser-based notebook computer such as Chromebook) with a processor, a memory, a screen, with connection capabilities of Wireless Local Area Network (WLAN), Wide Area Network (WAN), Wi-Fi, 2G, 3G, 4G and future generation data networks.

Mobile Operating System—the mobile device is configured with a full or partial operating system (OS) software, which provides a platform for running basic and advanced software applications. Software applications are available on Android, iPhone, BlackBerry, and Windows Phone platforms.

Social Media Data—a message (e.g., text message, instant message, Multimedia Messaging Service (MMS) message).

Social Networking—a social structure composed of individuals or organizations, which are also referred to as nodes, that are connected by one or more specific types of interdependency, such as friendship, professional profiles, financial exchange, common interest, kinship, relationships, beliefs, knowledge, prestige, dislike, or sexual relationships. Some current examples of social networking sites may include Facebook, LinkedIn, Twitter, Yelp, Orkut, Google's Social Circle, 腾讯 Tencent (www.qq.com), 新浪微博 Sina Weibo (www.weibo.com), Baidu, Inc. 百度 (www.baidu.com), 搜狐 (www.sohu.com), 人人网 (www.renren.com), Hyves, Nexopia, Skyrock, StudiVZ, and Tuenti.

Tweet—applies to any socially compact broadcasted form of expression which can apply to social networking and microblogging services including electronic messages, personal status updates, blog entries, micro-blogging posts (e.g., tweets and/or other status updates associated with Twitter, status updates associated with Google Buzz, status updates associated with Facebook, Sina Weibo feeds, Tencent WeChat feeds, etc.), news headlines, news articles, text, images, audio, video, links, and/or other content items. Languages supported include, but are not limited to, English, traditional/simplified Chinese, French, German, Italian, Spanish, Japanese, Korean, Indonesian, Thai, Vietnamese, Malay, Russian, Portuguese, Turkish, Polish, and Hindi.

Web Browser—a software application for retrieving, presenting, and traversing a Uniform Resource Identifier (URI) on the World Wide Web provided by web servers. Web browsers may include, but are not limited to, browsers running on personal computer operating systems and browsers running on mobile phone platforms. The first type of web browsers may include Microsoft's Internet Explorer, Apple's Safari, Google's Chrome, and Mozilla's Firefox. The second type of web browsers may include the iPhone OS, Google Android, Nokia S60, and Palm WebOS. Examples of a URI include a web page, an image, a video, or other type of content.

FIG. 1 is a system diagram 10 that illustrates the detection and classification of microblogging storms (also referred to as "Twitter storms" or "storms"). A storm detection server 12, which includes a central processing unit 14, a memory 16, and a microblogging storm engine 18, is coupled to a network 20 (either a wired network or a wireless network) for identifying abnormal and/or collective behavioral patterns in microblogging messages such as, but not limited to, Twitter. The storm detection server 12 receives a set of tweets or other microblogging messages from microblogging sites 22 and social networking sites 24. The storm detection server 12 is bidirectionally coupled to a database 26 for storing and retrieving information that includes the different types of microblogging storm patterns. An Application Program Interface (API) server 28 is coupled bidirectionally to the database 26 for receiving microblogging storm patterns and classifying the types of microblogging storm patterns for communication and distribution to the businesses and business partners 30 through a business application 32 and through a front end server 34 to the clients 36.

A set of tweets can contain tweets that have the same or similar words that describe a concept. For example, below are a set of tweets that were sampled from a Twitter storm regarding the bolts securing the passenger seats coming loose during several American Airlines flights. The early tweets all contain the word "loose." The final two tweets do not. The following table gives examples, but is not limited to, of a set of tweets that have a common concept: seats becoming loose on American Airlines aircraft.

| Date | Tweet |
| --- | --- |
| Oct. 01, 2012 | What's wrong with American Airlines? Loose seats causes emergency landing at JFK. Bound for Miami FL. #EPIC #FAIL #AA! |
| Oct. 01, 2012 | @jimnorton hope you're not flying American soon. Loose seats divert another American Airlines plane http://t.co/h5T3toec via @addthis |
| Oct. 01, 2012 | Loose seats force Boston-Miami flight diversion: An American Airlines Boeing 757 carrying 175 passengers from Bo . . . http://t.co/02sG9FVD |
| Oct. 01, 2012 | Loose seats force Boston-Miami flight diversion: An American Airlines Boeing 757 carrying 175 passengers from Bo . . . http://t.co/9QpQuWV2 |
| Oct. 01, 2012 | Safety top priority at #American Airlines? Loose seats force Boston-Miami flight diversion..http://t.co/LaTb2PMQ |
| Oct. 01, 2012 | Loose seats ground 3rd plane at JFK: Another American Airlines flight was forced to return to . . . http://t.co/c8g1VXeS #NY #News #NYNews |
| Oct. 01, 2012 | Loose seats on American Airlines flight force emergency landing in NYC http://t.co/aKh5xfwZ Fox News |
| Oct. 01, 2012 | Loose seats on American Airlines flight force emergency landing in NYC - Fox News http://t.co/jPy7n7Cj |
| Oct. 01, 2012 | (LOOSE BOLTS) American Airlines Seats Become Loose in Flight Before Emergency Landing. http://t.co/4Ji4gESO |
| Oct. 01, 2012 | More loose seats on American Airlines flights. The latest at 6pm. #wfaanews |
| Oct. 01, 2012 | More loose seats on an American Airlines plane. Find out what is going on with the airline. @nbc6 |
| Oct. 01, 2012 | Seats loose on American Airlines plane: Passengers already feeling the bumpy impact of a labor dispute at A . . . http://t.co/BHnjUU7W #cnn |
| Oct. 01, 2012 | Seats loose on American Airlines plane: Passengers already feeling the bumpy impact of a labor dispute at Americ . . . http://t.co/2Pfz2j16 |
| Oct. 01, 2012 | Seats come loose on American Airlines flight: Passengers feeling the bumpy impact of a labor dispute at American . . . http://t.co/731qL1x4 |
| Oct. 01, 2012 | Seats come loose on American Airlines flight: Passengers feeling the bumpy impact of a labor dispute at American . . . http://t.co/I6IxTbtF |
| Oct. 01, 2012 | Seats come loose on American Airlines flight: Passengers feeling the bumpy impact of a labor dispute at American . . . http://t.co/sIJP3HAj |
| Oct. 01, 2012 | Seats come loose on American Airlines flight: Passengers feeling the bumpy impact of a labor dispute at American . . . http://t.co/tg009uIF |
| Oct. 01, 2012 | Seats come loose on American Airlines flight http://t.co/Ba9rFxOv |
| Oct. 02, 2012 | RT @banglanews24com Disaster flights sink American AirlinesO reputation http://t.co/fel4pdxe via @banglanew . . . http://t.co/aQAE5FPi #orm |
| Oct. 02, 2012 | RT @farecompare American Airlines in Trouble: Scary Seats, More Delays, Angry Passengers http://t.co/5JR2e8QA |

In some embodiments, the present invention includes several distinctive features: (1) identify when a concept is being tweeted substantially more often than normal; (2) identify which tweets that are about the same and/or similar concept(s), even if the words used to describe the concept(s) are different; (3) categorize a concept that gets tweeted multiple times with similar or different words; (4) create a time-dependent plot of the tweets that contain the concept of interest; (5) identify the rate of increase or decrease of the frequency of a common set of tweets that are tweeted that contain the same or similar concept; (6) identify the acceleration of the amount of a common set of tweets that are tweeted that contain the same or similar concept; (7) identify periodic or semi-periodic groupings of a common set of tweets that contain the same or similar concept; (8) follow shortened or full length Uniform Resource Locator (URL) recursively until either the system can determine if the tweet contains the same or similar concept (the system reads the text contained in the tweets or on a referenced page to determine if the web page contains the same or similar concept); determine the cause and effect relationships between one or more common set of tweets that contain the same or similar concept; (10) perform time-series analysis, volume of tweets of same and/or similar concept vs. time, of tweets to categorize the shapes of the signals; and (11) detect and categorize many shapes of tweet signals, containing the same or similar concepts, such as, but not limited to, a sharp spike in volume, a thread where there are multiple spikes of tweet volume spaced apart in time, a relatively sharp increase in tweet volume followed by a long decrease, a gradual increase of tweet volume followed by a decrease, an oscillating amount of tweets, a spike followed by a relatively long time of low volume followed by another spike of tweets.

Figure 2:
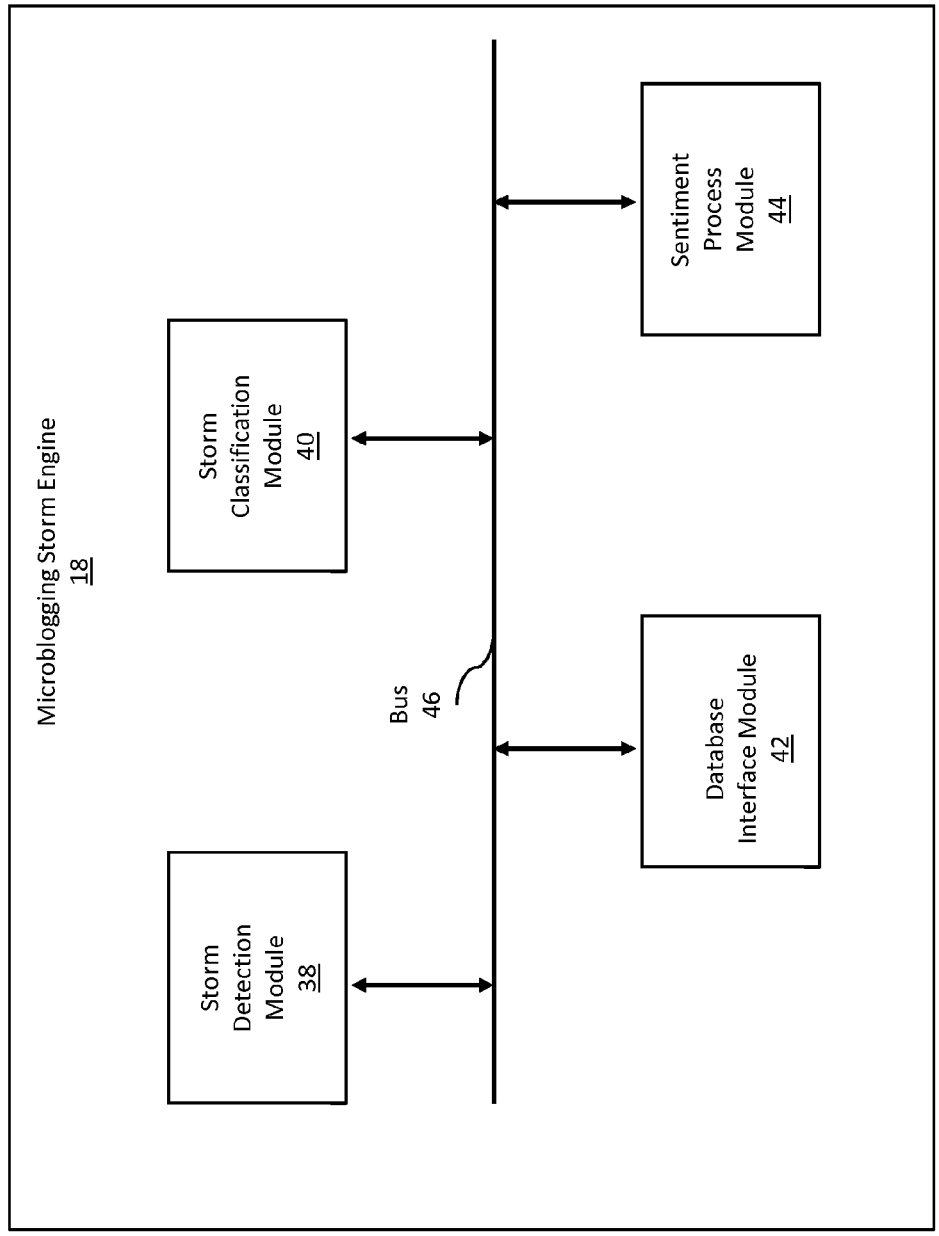
FIG. 2 is a software system diagram illustrating a Twitter storm engine for detecting and classifying Twitter storms in accordance with the present invention.

FIG. 2 is a software system diagram illustrating a Twitter storm engine 18 that includes a storm detection module 38, a storm classification module 40, a database interface module 42, and a sentiment process module 44. The storm detection module 38, the storm classification module 40, the database interface module 42, and the sentiment process module 44 are communicatively coupled with each other via a communication bus 46. The storm detection module 38 is configured to detect different patterns of microblogging storms by capturing the volume of a particular storm to assist in output statistical analysis. The storm classification module 40 is configured to classify the storms into different types of a particular storm category. The database interface module 42 is configured to communicate with the database 26 for transferring or receiving data from the database 26. The sentiment process module 44 is configured to determine positive sentiment or negative sentiment from analyzing microblogging messages.

In one embodiment of the present invention, the term "storm" is defined mathematically by the following equation:

pattern recognition module 50 including a clustering component 52 and a storm determination component 52, and a statistical analysis component 56. The parser component 48, the storm pattern recognition module 50, and the statistical analysis component 56 are communicatively coupled via a bidirectional bus 58. The parser component 48 is configured to parse each tweet to objects according to a set of predetermined rules, using either natural language or computer languages, to generate a signature from the associated tweet. The results will be a high number of objects, such as tens, hundreds, thousands, millions or more. The cluster component 52, communicatively coupled to the parser component 48, is configured to cluster similar objects together into different clusters. The storm determination component 54, communicatively coupled to the cluster component 52, to determine from the clusters of objects which ones constitute microblogging storms and which ones do not by comparing the clusters of objects with existing storm patterns stored in the database 26. The statistical analysis component 56, communicatively coupled to the storm determination component 54, is configured to conduct statistical analysis of the various data from the tweets or derivatives of the tweets, including signatures, thresholds for storms, and storm patterns.

As an example to illustrate the storm detection module 38, the parsing component 48 may extract the first character of each word to create a signature. The storm detection module $$\text{Storm}(P_j) = \begin{cases} 1 & \text{if } \sum_{i=1}^{n} g(f(T_i, P_j), \delta_j) \geq S_j^k \\ 0 & \text{otherwise} \end{cases}$$

$$f(T_i, P_j) = \hat{T}_i \cdot \hat{P}_j = x_{ij}$$

$$g(x_{ij}, \delta_j) = \begin{cases} 1 & \text{if } x_{ij} \geq \delta_j \\ 0 & \text{otherwise} \end{cases}$$

$$S_j^k = \begin{cases} \gamma & \text{if } k = 0 \\ h(S_j^{k-1}, f(P_j)) & \text{otherwise} \end{cases}$$

| Symbol/Term | Description |
|---|---|
| $T_i$ | the vector representing tweet vector I (optional - may be normalized to the tweets in a given time window) |
| $P_j$ | the pattern vector for pattern j (optional - may be normalized to other vector patterns) |
| f | a function that computes the similarity score of a message tweet $T_i$ to a given reference pattern $P_j$ |
| g | a function that compares the similarity score, the result of $f(T_i, P_j)$ of a message tweet $T_i$ and $P_j$, to a threshold $d_j$ in order to create a counting score to determine if a group of messages $T_i$ comprise a storm. An example of a similarity score, f, is a dot product of $T_i$ and $P_j$, and the dot product is greater than a threshold $d_j$ |
| $S_j^k$ | the pattern specific threshold (or storm threshold, or shape function threshold) learned after k-1 iteration |
| $\delta$ | a threshold for similarity of tweet to a referenced pattern |
| $\gamma$ | an initial value (or initial shape function threshold) of $S_j^k$, where k = 0 |
| $\delta_j$ | a pattern specific similarity threshold value |

Suppose if a tweet is characterized as a vector, then the dot product of $T_i$ by $P_j$ would produce a tweet-to-pattern matching score. If the summed scores, to the right of the inequality are greater than the threshold $S_j^k$, then the accumulated tweets qualify as a storm. However, if the symbol $S_j^k$ is less than the value of the threshold, $\delta_j$, there are insufficient tweets to qualify as a storm.

Figure 3:
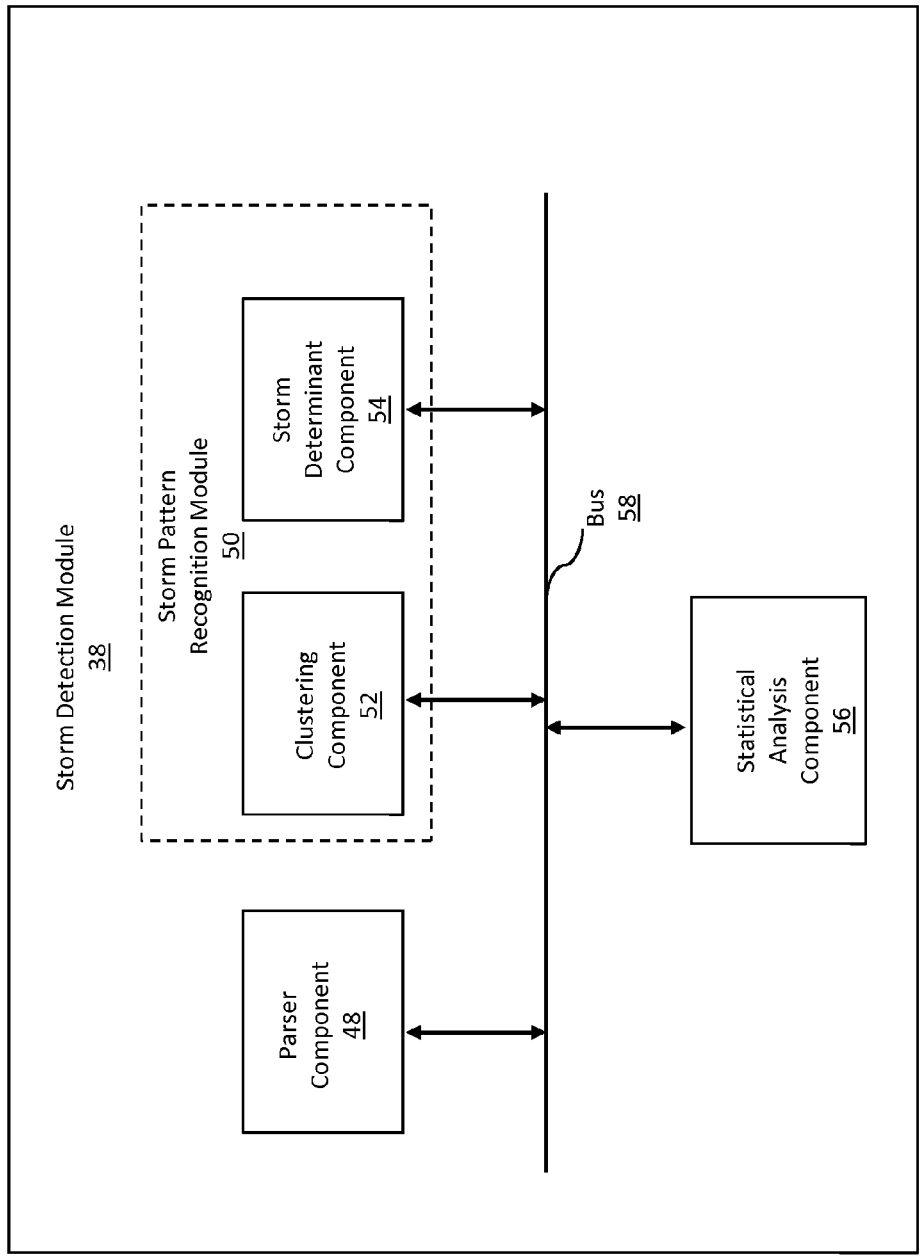
FIG. 3 is a software system diagram of the storm detection module illustrating the process in parsing, clustering and determining a Twitter storm in accordance with the present invention.

FIG. 3 is a software system diagram of the storm detection module 38 that includes a parser component 48, a storm 38 is configured to determine if the signature matches with the ones already in the database 26 or a memory. On the one hand, if the signature has been identified to match an existing signature in the database 26, the clustering component 52 is configured to cluster the newly created signature with the existing signature in the database 26 and increment the frequency count. The frequency count can be a number, such as in the hundreds, where the frequency count for that particular signature will continue to get incremented when the same signature is determined from a new tweet, but the frequency count is yet sufficient to qualify as a storm. When the frequency count of a signature becomes a number that is larger than a predetermined threshold, the signature then is identified as a storm. On the other hand, if the signature is new, which does not match with any existing signatures in the database 26, the signature is added as a new item to the list of signatures in the database 26. Another way of categorizing a set of tweets is to see if the frequency count vs. time matches or exceeds prior frequency count vs. time shape functions, the signature can also be identified as a storm. Each tweet will undergo such process. The above illustrates one algorithm for generating a signature. Other types of algorithms may be practiced with departing from the spirits of the present invention. In some embodiments, the algorithms are able to parse and identify the microblogging messages based on the meaning of each microblogging message. In other embodiments, the algorithms would parse and identify features or characteristics of each microblogging message in respect of the meaning, which can be widely applicable to foreign languages like Chinese, French, German, Indian, Japanese, Korean, Spanish, Russian, etc.

Figure 4:
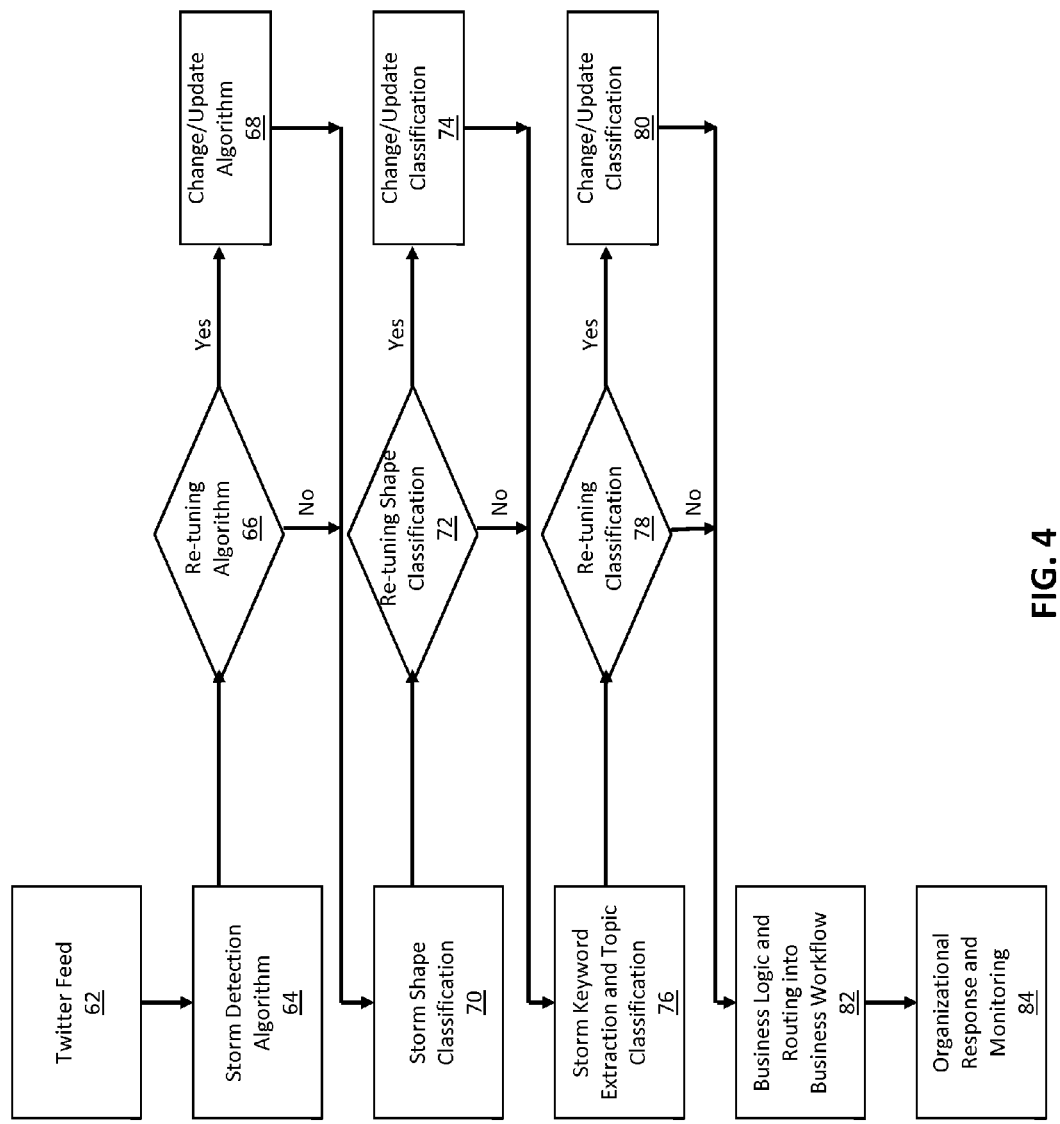
FIG. 4 is a flow diagram illustrating the process of a Twitter storm detection and business work flow in accordance with the present invention.

FIG. 4 is a flow diagram illustrating the process 60 of a Twitter storm detection and business work flow. At step 62, the microblogging storm engine 18 is configured to detect the presence of a tweet. At step 64, the storm detection algorithm 38 is configured to detect a microblogging storm. Some embodiments of the storm detection algorithm 38 are described below as illustrations to implement the present invention, where other types and variations of the storm detection algorithm 38 are feasible and within the scope of the contemplated invention. In a first embodiment of the storm detection algorithm 38, a pattern recognition algorithm seeks to detect repeated sequences of words or tokenized words or their sub-strings. This approach is generally preferred because it yields very fast results. In a second embodiment of the storm detection algorithm 38, a knowledge-based algorithm categorizes the contents of each tweet and identifies keywords. The knowledge-based algorithm then seeks for and groups tweets that have common categories and keywords.

Several methods to categorize tweets are possible. The first way is to create lists of keywords and/or word sequences that are aggregated into a list to define a category. Another way of categorizing tweets is to utilize standard, open-source or commercial categorization algorithms/programs. Examples of such algorithms are, but are not limited to, support vector machines, neural networks, Bayesian statistical algorithms, and linear regression. Examples of open-source programs are, but are not limited to, Dragon (which can be obtained from http://dragon.ischool.drexel.edu), UIMA (which can be obtained from http://uima.apache.org), Stanford NLP Software (which can be obtained from http://nlp.stanford.edu/software/index.shtml), and GATE (which can be obtained from http://gate.ac.uk). Examples of commercial categorization engines are, but are not limited to, Metavana, Lexalytics, and Clarabridge.

One example of the source codes for implementing the storm detection is shown below:

Identifying storm patterns:
    for each pattern $P_j$ in P:
        sum = 0
        for each tweet $T_i$ in T:
            sum = sim($T_i$, $P_j$)
        if sum > thr (i.e., $\delta_j$):

-continued pattern $P_j$ is a storm
Identifying tweet as storm:
    for each tweet $T_i$ in T:
        for each pattern $P_j$ in storm_patterns:
            if sim($T_i$, $P_j$) > thr($\delta_j$):
                tweet $T_i$ is a storm.

Prior to proceeding to the storm shape classification at step 70, the storm detection module 38 is configured to determine whether re-tuning of the storm detection algorithm 64 is applicable at step 66. If the storm detection algorithm requires re-tuning, at step 68, the storm detection module 38 is configured to change the previous storm detection algorithm with a new storm detection algorithm, or update the parameters of the storm detection algorithm with new values, either in whole or in part. If the storm detection algorithm does not require re-tuning, the process continues to the storm shape classification at step 70.

After the Twitter storms have been identified, at step 70, the storm classification module 40 is configured to classify the kind of storm and how the storm data can be useful in commercial, political, economical, technological, or other types applications. Classifications of storm categories can be wide and vary to describe and/or tag a Twitter storm, of which examples include, but are not limited to, Curiosity, News, Safety, Spam, Emotional, Marketing, Product Quality/Reliability, Customer Service, Pricing, Finance, Sports, Politics, Business, Entertainment, Terrorist, etc. For example, once a Twitter storm is identified, businesses would like to know how to use the Twitter storm data. Some Twitter storms, such as the example where the bolts on airplane seats became loose, would be important for notifying the company that there has been a publicly known safety problem aboard its planes. Continuing with this scenario where there was an explosion of tweets regarding the loose seat bolt problem, American Airlines would be prudent to alert people in their public relations, legal, and maintenance departments to monitor and publicly and internally respond to the situation. Since the sources of the "loose bolt" were from news outlets, "News" could be one of the categories used to describe this storm. As further elaborated below, there is an example of a joke involving the singer "Adele" that gets confused with the laptop computer brand "Dell" which can be categorized as "Curiosity" and forwarded to the marketing department. In order to assist the Twitter storm algorithm to discern how to tag a Twitter storm, designers of the storm detection server 12, as well as the users, can supply the microblogging storm engine 18 with a set of rules or training data to contribute to the effectiveness and accuracy of the microblogging engine 18.

Figure 5A:
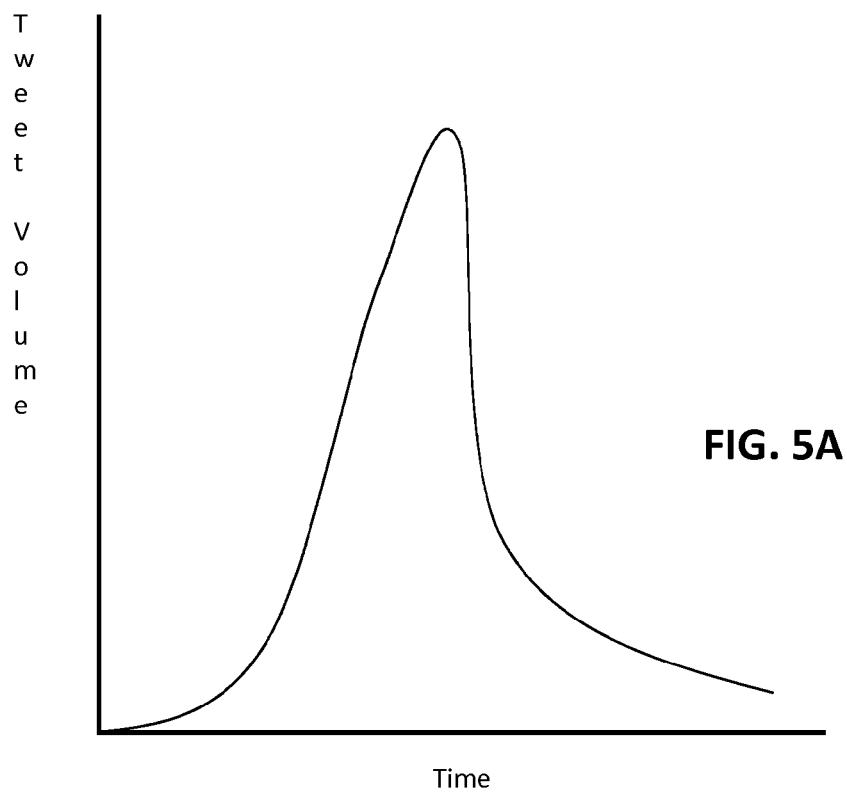
FIG. 5A depicts a graphical diagram illustrating a Twitter storm that is classified in a "spike" shape category.
Figure 5B:
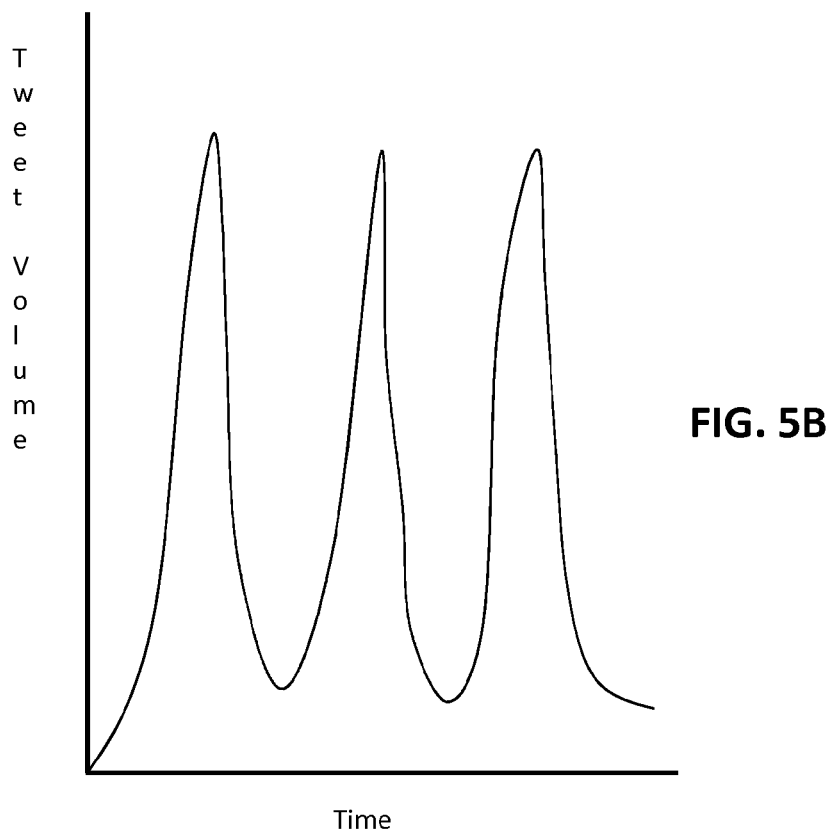
FIG. 5B depicts a graphical diagram illustrating a Twitter storm that is classified in a "thread" shape category.
Figure 5C:
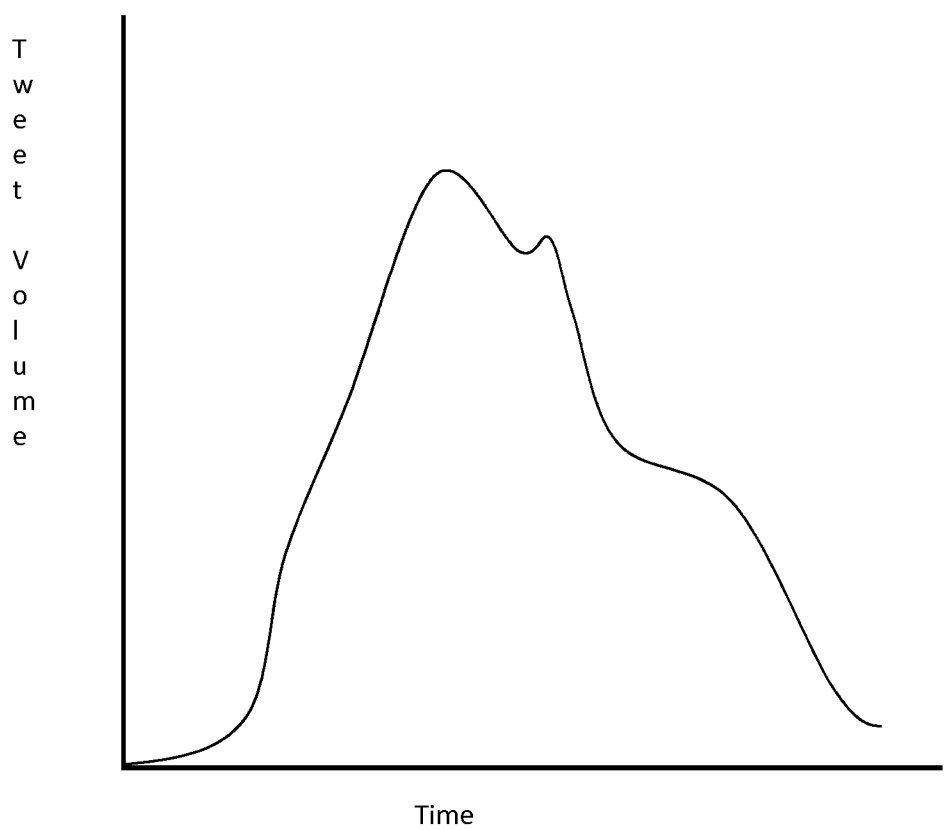
FIG. 5C depicts a graphical diagram illustrating a Twitter storm that is classified in a "long tail" shape category.

Sample graphical illustrations of storm shapes are shown below with respect to FIGS. 5A-5C. FIG. 5A depicts the graphical representation of a Twitter storm that is classified in a "spike" shape category. FIG. 5B shows the graphical representation of a Twitter storm that is classified in a "thread" shape category with multiple "spike" phenomena. FIG. 5C depicts the graphical representation of a Twitter storm that is classified in a "long tail" shape category with fast rise and slow decaying phenomena.

Twitter storms are phenomena where our source data is flooded with frequently recurring items. Some of the items may be treated as "noise" where the same item is re-tweeted thousands of times, or they can serve as a "signal" that people are genuinely upset about something and it has real sentiment-magnitude. While first discovered in Twitter, statistically this phenomenon can occur in many other social media and microblogging settings, including, but not limited to, Google+ streams, Facebook, Sina Weibo, or Tencent WeChat.

Twitter storms can potentially flood the microblogging storm engine 18 with input data streams that can either drown out useful information or create problems with how to weight a storm. Even if a Twitter storm is detected, key issues remain as to what to with the storm data, among which noise and weighting are highlighted below.

Noise: For noise it should be removed.

Weighting: For a signal, there is a question as to how to weight a storm in the final analysis of sentiment-magnitude. For example, if a re-tweeted event is identical but deemed signal and re-tweeted 10,000 times, we can treat the re-tweet as a "1" event since it is the same information, or give it weighted output, (e.g. 10,000×) because the re-tweeting is relevant in terms of magnitude. The storm detection module 38 is configured to produce an output, which captures the volume of a particular Twitter storm in order to assist in output statistical analysis.

The following are some examples of Twitter storms:

Examples of Twitter storms:

A Dell rolling in the deep—this was a joke based on a play on words, or confusability between "Adele" the singer and "A Dell" laptop where the laptop fell into some water and tumbled as it sank.

United Airlines did not care about the 10-year-old girl—this was a heartless event where an escort service that was supposed to ensure that a girl would catch her connecting flight in the mid-west en route to a summer camp. The escort personnel never showed up and the girl received no help from United despite numerous pleas for assistance from her distraught mother.

Kim Kardashian—this was an enormous set of tweets that described how she was angry because British Airways opened her luggage and stole her father's keepsakes.

DELLPAKISTAN—this was the signature of a flood of spam messages regarding promotions of Dell computing products in Pakistan Algorithm Type 0:
   sort all quotes by alphabetical order
   look very quickly for repeated phrases
   if there are many (can have several levels of thresholds for "small," "medium," and "large" that can be the lesser of a percentage of total verbatims/tweets or real threshold numbers) repeated phrases which are actually re-tweets, then it is probable it is a real Twitter storm
   if there are many (can have several levels of thresholds for "small," "medium," and "large" that can be the lesser of a percentage of total verbatims/tweets or real threshold numbers) repeated sub phrases (e.g. "United" and "10-year-old girl" are found in many tweets, then its probably a Twitter storm
   if the categories of objects within the tweet are very unusual, like a computer brand (Dell) and water (chemical) and rolling (motion verb), then it is a rare combo and likely to be spam-like
   Other algorithm techniques:
   know the baseline category histogram
   get the baseline category histogram and normalize it
   get the tweet histogram and see if it fits
   get the first letter for each word and look for repeats
   sort the words of each sentence and make a histogram
Twitter Storm Detector (TSD)

Assuming: Looking for common identical patterns repeated many times over a corpus, e.g. "A Dell rolling in the deep" etc.

Algorithm 1: Prefix String Histogram
   Given sentences such as:
   "The quick brown fox jumped over the dog"
   take prefix string and make a token:
   "The quick brown fox jumped over the dog"
   transform to token by taking first letter and combining:
   =Tqbfjotd
   then move to unified case:
   toLower("Tqbfjotd")=tqbfjotd
   Now run over the entire corpus and take a look at the histogram. Decide how many repeated items in the corpus should be treated as same (several options for this). More than a threshold (e.g. if more then 15 items have same signature then put those entries aside for special processing). Look for inflection point to decide.

One potential issue is that the algorithm catches frequently recurring items and groups them but does not filter, which implies a need for post-grouping analysis.
   A Dell rolling in the deep→Noise
   United loses 12-year-old boy→frequent, but not noise
   For parameter choices, the algorithm can use more than one character in prefixing, such as the first 2 characters). In terms of compute and memory trade-offs, the processor 14 is in essentially O(n) state—constant time operation, and therefore does not present significant memory issues.

Algorithm 1A: Index String Histogram with Sorting
   In this algorithm, which is similar to Algorithm 1 in some aspects, the prefix string is sorted. For example, take a prefix string and construct a token:
   "The quick brown fox jumped over the dog"
   transform to token by taking first letter and combining:
   =Tqbfjotd
   now sort(Tqbfjotd)==>bdfgjotT
   then move to unified case:
   toLower("bdfgjotT")=bdfgjott
   Now sort based on this string and use the rest of Algorithm 1 as noted above.

Algorithm 2: Index String Histogram
   Each token is selected and the token added to a map. Thus, token1==>1, token2==>2 and so on. If 32 bit integers are used, each time a new token is added to the map the token is mapped to a machine-word-friendly sized integer. The tokens are mapped across the entire corpus. The token map can possibly be preserved across all domains (if so this may require 64 bit integers).

This means that a phrase "The quick brown fox jumped over the dog" is mapped as follows:
   [23, 145, 203, 39, 494, 3, 3013]

Now run over the entire corpus and take a look at the histogram. Conduct the process as algorithm 1 for a like-grouping detection. One potential issue may arise. Like Algorithm 1 described above, Algorithm 2 catches frequently recurring items and groups them that does not filter, which implies a need for post-grouping analysis.
   A Dell rolling in the deep→Noise
   United loses 12-year-old boy→frequent, but not noise
   Unlike Algorithm 1 above, Algorithm 2 is more sensitive since Algorithm 2 is using exact word mappings so now spelling errors are not treated the same, per se.

However it does not confuse similarly beginning words (e.g., dog and dufus do not become the same item). If the token dictionary is preserved across run time instances, then run time should still be ~O(n).

On parameter choices, Algorithm 2 can use more than one character in prefixing, such as the first 2 characters. In terms of compute and memory trade-offs, the processor 14 is in essentially O(n) state—constant time operation, and therefore does not present significant memory issues.

Algorithm 3: Index Sub-String Analysis

Assuming the token-integer strings similar to Algorithm 2, the microblogging storm engine 18 is configured to perform efficient sub-string analysis.

Extract for each tweet in corpus all the sequential 1, 2, 3, 4 grams and the Algorithm 2 signature, which means 5-grams and higher are not captured. Now we will have a histogram of 1 gram, 2 grams, 3 grams, and 4 grams. In examining clustering of the 2-3-4 grams to determine storm patterns, this can help to detect sub-strings, like news events where a quote or a piece of information is re-tweeted but is accompanied by other text.

Algorithm 3a: Fuzzy Index Sub-String Analysis
Assume we have a distance metric for any 2 tokens.
Distance=Dt(token1, token2)
Possible distance metrics:
# of like chars/token-length-of-smaller-string
phonetic equivalence between 2 tokens (can be a look up large table)
# of like chars/number-of-unique-characters-in-both-string Now perform same clustering similar to Algorithm 3, but, instead of histogram (exacting clustering for sub-string entries) as each item is plotted in N-space (e.g. 2 space, 3 space, 4 space), the clustering is based on Euclidean distance as defined by either Algorithm 1 or 2. This can lead to developing certain intuitions for further state-characterization analysis at the n-gram level. This also can work at the grammar level.

Algorithm 4: Clustering based Twitter Storm Detection
Assume we have a distance metric for any 2 strings.
Distance=Dt(string1, string2)
Possible distance metrics:
of-tokens-that-are-common-in-both-strings/# of-tokens-in-the-union-of-these-two-strings
Now perform clustering:

For each new tweet, compute its similarity to the existing clusters' tweets and find the maximally similar tweet. If the maximal similarity above is the predefined threshold, then merge this tweet with the cluster of maximally similar tweets. Otherwise, create a new cluster for this new tweet.

This can help to detect sub-strings, like news events where a quote or a piece of information is re-tweeted but is accompanied by other text. These will be clustered together with the other news/storm events, thus the size of the storm will be determined more precisely.

Algorithm 5: Twitter Storm Categorization

Once the posts are identified as storms, the next step is to classify them by type of storm. The storm classification module 40 is configured to classify a storm into four or more different categories, for example, but not limited to: (1) Spam, (2) News, (3) Emotional, (4) Curiosity.

Given that this is a machine classification issue, the microblogging storm engine 18 is configured to select a set of features for use with any of the well-known classification algorithms.

Returning now to step 72 in FIG. 4, the storm classification module 40 is configured to determine whether re-tuning of the storm detection classification 70 is applicable. If the storm detection classification requires re-tuning, at step 74, the storm classification module 40 is configured to change the previous storm shape classification with a new storm shape classification, or update the parameters of the storm shape classification with new values, either in whole or in part. If the storm shape classification does not require re-tuning, the process continues to the storm keyword extraction and topic classification at step 76. The microblogging storm engine 18, step 76, is configured, to extract keywords from the storms for classifying the storm class and identifying the storm topics, which are then stored in the database 26. At step 78, the microblogging storm engine 18 is configured to determine if the storm keyword classification and topic classification would require re-tuning. If the storm keyword extraction and topic classification requires re-tuning, at step 80, the microblogging storm engine 18 is configured to change the storm keyword extraction and topic classification, or update the parameter values in the storm keyword extraction and topic classification. If the storm keyword extraction and topic classification does not require re-tuning at step 78, the process proceeds directly to step 82.

At step 82, the microblogging storm engine 18 is configured to provide the data output from the storm keyword extraction and topic classification 76 to integrating into a business entity's business logic and routing into business workflow. For example where the Twitter storm is positive, if there is a Twitter storm that is deemed humorous to a particular company, it may serve usefully to provide such information to the publication relations department of the company which can use the Twitter storm data for the benefits of the company, such as producing commercials or interacting with consumers in a fun manner. For example, where the Twitter storm is negative to a company, that company would want to learn about the Twitter storm data right away to manage and control a negative situation that would impact the company's reputation and liabilities. In one embodiment, a particular business or customer may actually have a set of classifying keywords they are looking to identify, like "I smell gas," "explosion" and the like that may constitute an emergency. Now, the storm keyword and topics are routed to businesses that alert them that there could be disaster brimming. The coupling between the analysis conducted by the microblogging storm engine 18 and the businesses enables the fast communication of Twitter storms, whether the Twitter storms occur for good reasons or bad reasons. The business entities that are subscribers to an entity that runs storm detection servers, such as Metavana of Menlo Park, Calif. (www.metavana.com), would receive useful communications about the detected Twitter storms. At step 84, the storm detection server 12 can operate with its customers for organizational response and monitoring.

Figure 6:
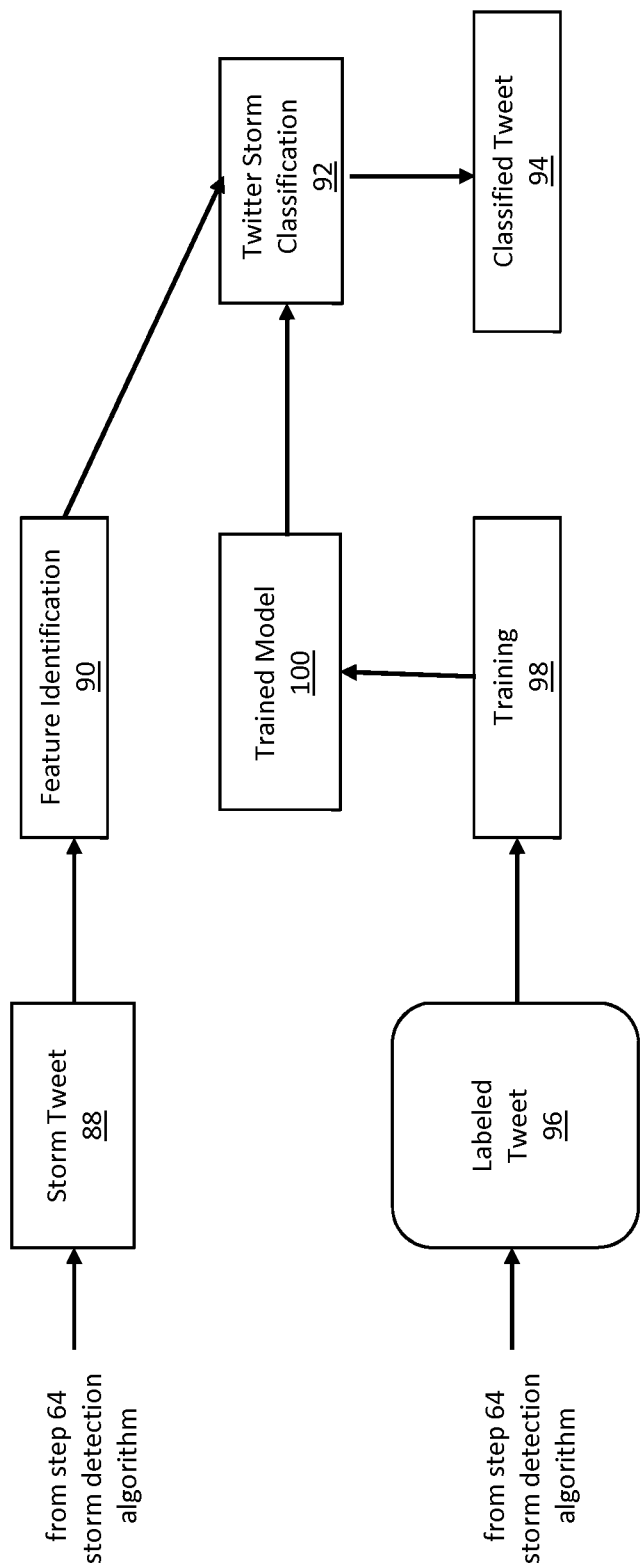
FIG. 6 is a flow diagram illustrating the process of training a learning model to improve the classification of Twitter storms in accordance with the present invention.

FIG. 6 is a flow diagram illustrating the process 86 of training a learning model to improve the classification of Twitter storms. The output from the storm detection algorithm in step 64 is fed in a dual stream into a feature identification path at step 88 and a learning machine training model at step 90. At step 88, the microblogging storm engine 18 is configured to identify a tweet as storm. At step 90, the microblogging storm engine 18 is configured to identify the features of the storm. The microblogging storm engine 18 is configured to classify the type of Twitter storm at step 92, and the tweet has been classified at step 94.

In another path, the microblogging storm engine 18 is configured to label the tweet at step 96 from the storm detection algorithm at step 64. Several observations can be drawn from the characteristics of a tweet. First, news items are either re-tweets or bare tweets with links, whereas spam items are often direct tweets. Generally, spam items often have prices and a list of products or services offering a discount. The names of the authors of spam tweets frequently have topic names/terms embedded in the names. For example, for the hospitality business, "HotelCrow" is the name of the author and contains the string "hotel," which is a keyword in the hospitality business. Second, spam tweets tend to have more users mentioned than normal tweets. Similarly they tend to have more than the average number of hashtags. Third, spam tweets have a short life duration and the rate of dissemination is much controlled and limited. Fourth, the rate of words starting with an uppercase letter in a tweet can also assist in distinguishing between news and spam. Fifth, the rate and duration of a storm can assist in identifying and distinguishing between a news storm and a curiosity storm. Sixth, curiosity storms tend to have the same (exact) tweet with no links repeated a lot. Seventh, an emotional storm has repeating sub-strings associated with positive or negative sentiment orientation. Based on the above observations, the features identified below with a set of well-known machine learning algorithms such as Decision Trees, Naive Bayes, Support Vector Machines, etc. can be used to train the system at step 98 to distinguish between the classes of storms: isRetweet, isDirectedTweet, number of hashtags, number of user mentions, rate of dissemination, duration of the storm, number of words starting with uppercase letter, contains a link, number of same (exact match) tweets, sentiment orientation, number of tweets in this storm. The microblogging storm engine 18 is configured to generate a trained model at step 100.

Figure 7:
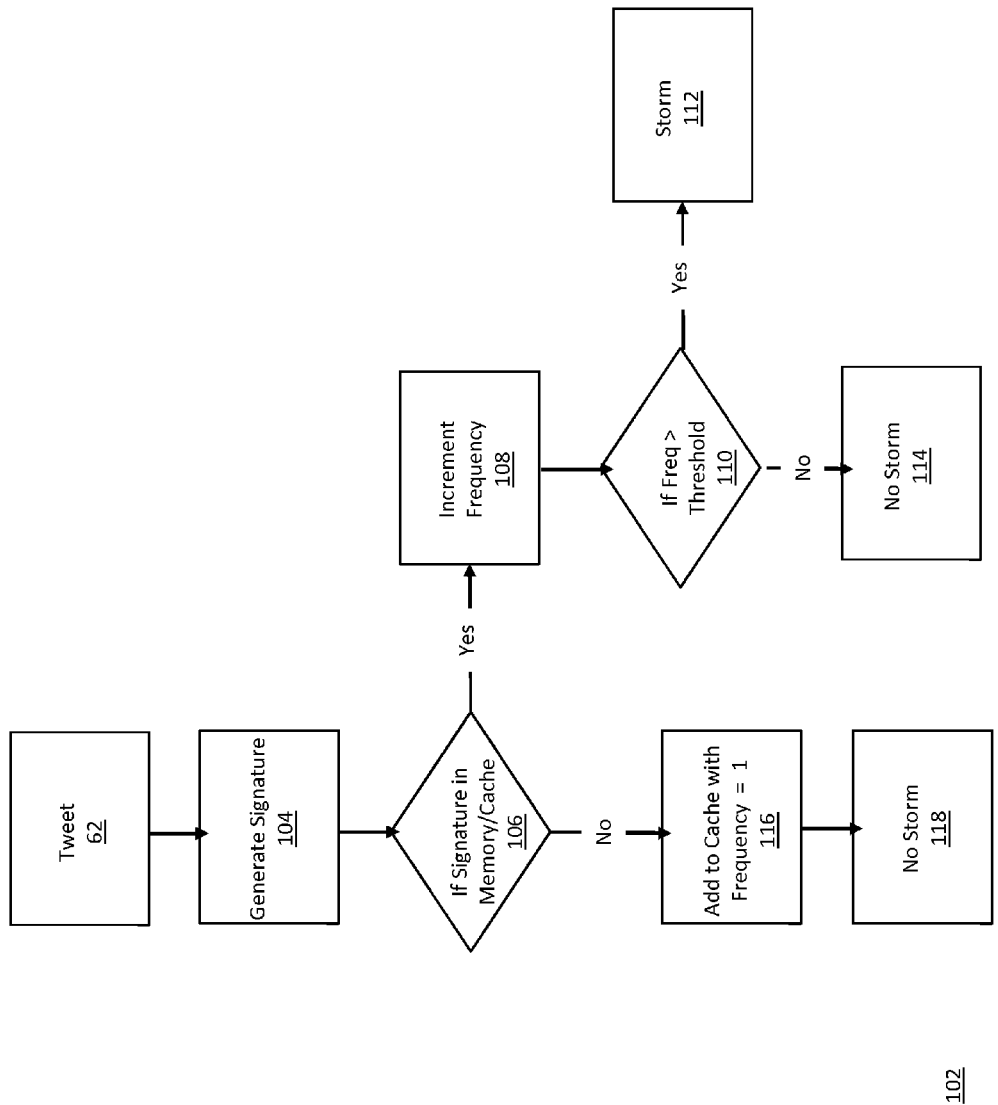
FIG. 7 is a flow diagram illustrating the process of generating a signature associated with a tweet and increment the frequency count in accordance with the present invention.

FIG. 7 is a flow diagram illustrating the process 102 of generating a signature associated with a tweet and increment the frequency count. At step 104, the parser component 48 of the storm detection module 38 is configured to parse a tweet and generate a signature. The parsing component may, for example, extract just the first character of each word in the tweet to create a signature. At step 106, the storm detection module 38 is configured to determine if the signature already exists in the memory 16 or the database 26. If the generated signature matches with one of the signatures already stored in the memory 16 or the database 26, the storm detection module 38 is configured to cluster the generated signature with the previously stored signature(s) and increment the frequency by one (or by a weighted factor) at step 108. At step 110, the storm detection module 38 is configured to determine if the frequency value of that particular signature exceeds a storm threshold. The result of the determination will identify whether the frequency count for that signature is sufficient to qualify as a storm in step 112. If the frequency count is insufficient to qualify as a storm, the result indicates that there is no storm at step 114.

If the generated signature does not match with any existing signature in the memory 16 or the database 26, the storm detection module 38 is configured to add the signature to the cache (or memory 16, or the database 26) and the frequency will be set to one (or some weighted factor) at step 116, which further results in a determination of no storm at step 118.

Each tweet undergoes the process 102. When the frequency count of the signature becomes larger than the threshold, the signature is now identified as a storm; otherwise, there is no storm. Different algorithms are described, for example, above for generating signatures.

Figure 8:
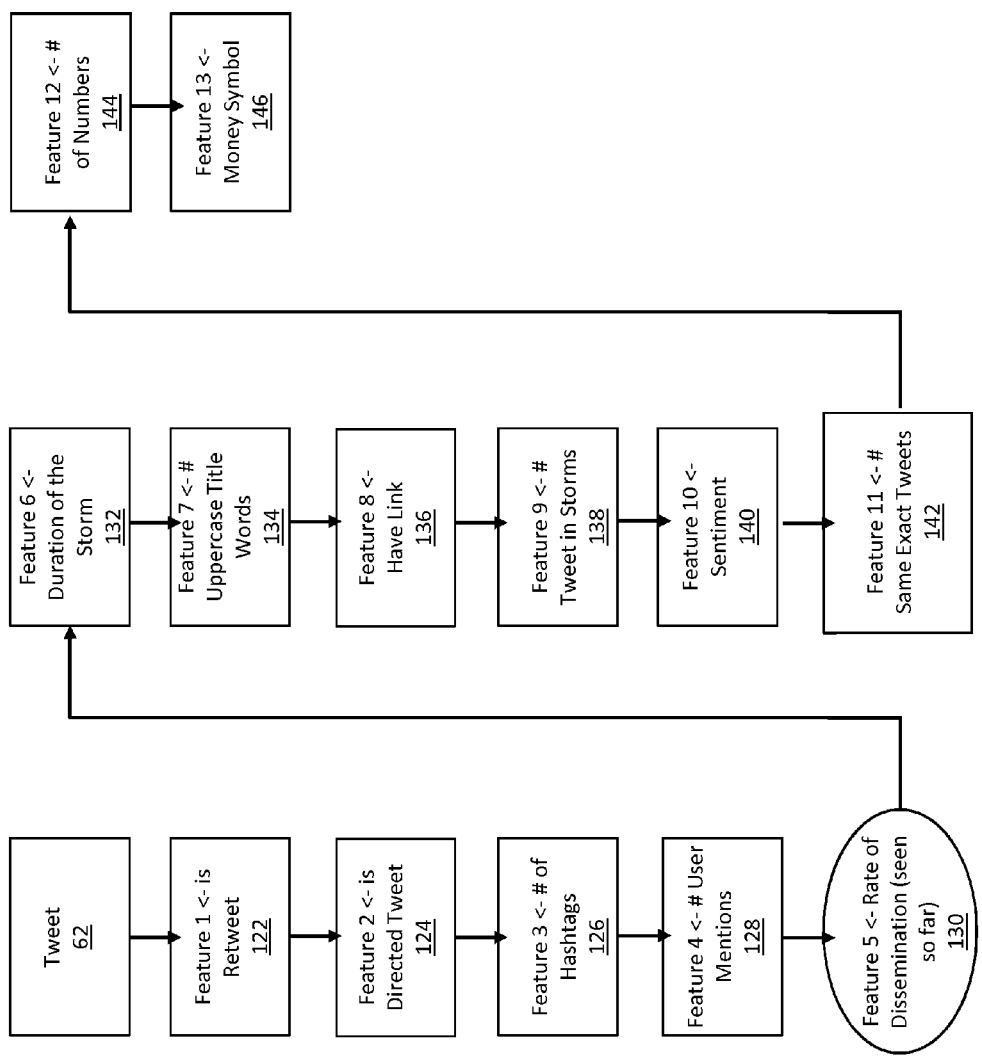
FIG. 8 is a flow diagram illustrating the process of a feature extraction of a tweet in accordance with the present invention.

FIG. 8 is a flow diagram illustrating the process 120 of a feature extraction of a tweet. The microblogging storm engine 18 is configured to identify the features from the tweets at 64. Several exemplary features are illustrated in FIG. 8, which are associated with feature identification described with respect to step 90, and many other additional or modified features can be practiced without departing from the spirit of the present invention. Although the identification of these 13 features is shown to occur in series, the process 120 can occur in any sequence, in parallel, or in some combination of series and parallel processing. At step 122, microblogging storm engine 18 is configured to identify a first feature type as to whether the received tweet is a re-tweet or the tweet has been re-tweeted. At step 124, the microblogging storm engine 18 is configured to identify a second feature type if the received tweet is a directed tweet, e.g., where the tweet is directed to a person. At step 126, the microblogging storm engine 18 is configured to identify a third feature type of the number of hashtags. Hashtags refer to a word or a phrase prefixed with a hash symbol, "#", where there is no space between the hashtag and the associated word or phrases. Short messages on microblogging and social networking services such as Twitter or Instagram may be tagged by putting "#" before a selected word or words, such as when the word appears in a sentence. Hashtags could serve as an indicator for a different types of microblogging storms. However, if a tweet has more than two or three tags, the tweet is more likely to resemble a spam.

At step 128, the microblogging storm engine 18 is configured to identify a fourth feature type in which, if the number of user mentions is greater than a predetermined sum, the tweet is likely to be a spam. The fifth feature type in step 130 relates to count, while the sixth feature type in step 132 relates to time. Both the rapidity of count and the duration of time (tweet count number versus time) affect the identification on the shape of a microblogging storm. A high number of tweet counts within a short period of time may create a quick spike, which could indicate that a particular issue garnered a lot of interest at a particular point in time. One possible characteristic of a spam arises from a coordinated robotic attack or marketing message attack. If the graph shows that the feature of the tweets spikes up quickly and dies down quickly, e.g. over the span of one hour, this cluster of tweets may be suspicious, which and more likely to be classified as a spam rather than a microblogging storm. In one scenario, naturally occurring new storm and effect would occur over several days, such as two to three days. The actual timescale is a factor in analyzing whether a cluster of tweets constitutes a storm. Typically, when the public responds to a notable event, the storm in one embodiment resembles a ringing curve. When the storm curve is too quick or too erratic, where the timescale does not appear to be natural, a classifier may suspect that the cluster of tweets may be a spam and notate the curve accordingly. The results from steps 130 and 132 can be sent for further analysis by a computer or a human to score the cluster of tweets, tag the cluster of tweets, and determine if the tweets are real microblogging storms or spams. Therefore, the different clusters of tweets, which are plotted in graphical or statistical curves, may represent valid representations of different types of Twitter storms.

Other additional exemplary features are shown in steps 134, 136, 138, 140, 142, 144 and 146, where the microblogging storm engine 18 is configured to identify whether the following respective feature is found in a received tweet—the number of uppercase title in words at step 134, the existence of a link at step 136, the number of tweets in storms at step 138, the sentiment view of a tweet at step 140, the number of exact tweets at step 142, the numerical count of numbers in a tweet at step 144, and the presence of a money symbol in a tweet at step 146. In one scenario, if a tweet has many numbers or money numbers, this could be a signal that someone is trying to sell some product or service, in which case more weight could be assigned to the tweet. Messages can be identified based on whether they contain a link, such as a URL. Any of the features identified in FIG. 8 can also be given a weighted function to a feature to emphasize the significance of that particular feature in the tweet.

Figure 9:
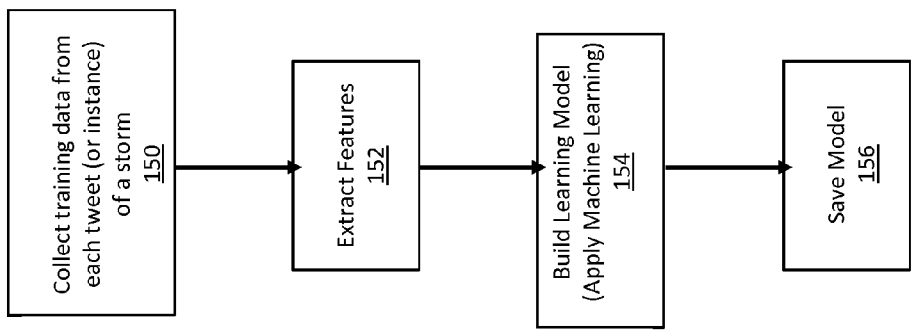
FIG. 9 is a flow diagram illustrating the process of a learning phase during storm classification in accordance with the present invention.

FIG. 9 is a flow diagram illustrating the process 148 of a learning phase during storm classification. At step 150, the microblogging storm engine 18 is configured to collect training data from each tweet (or instance of a storm). The microblogging storm engine 18 is configured to extract features from each tweet at step 152. At step 154, the microblogging storm engine 18 is configured to build a learning model by applying machine learning. At step 156, the microblogging storm engine 18 is configured to save the learning model.

Figure 10:
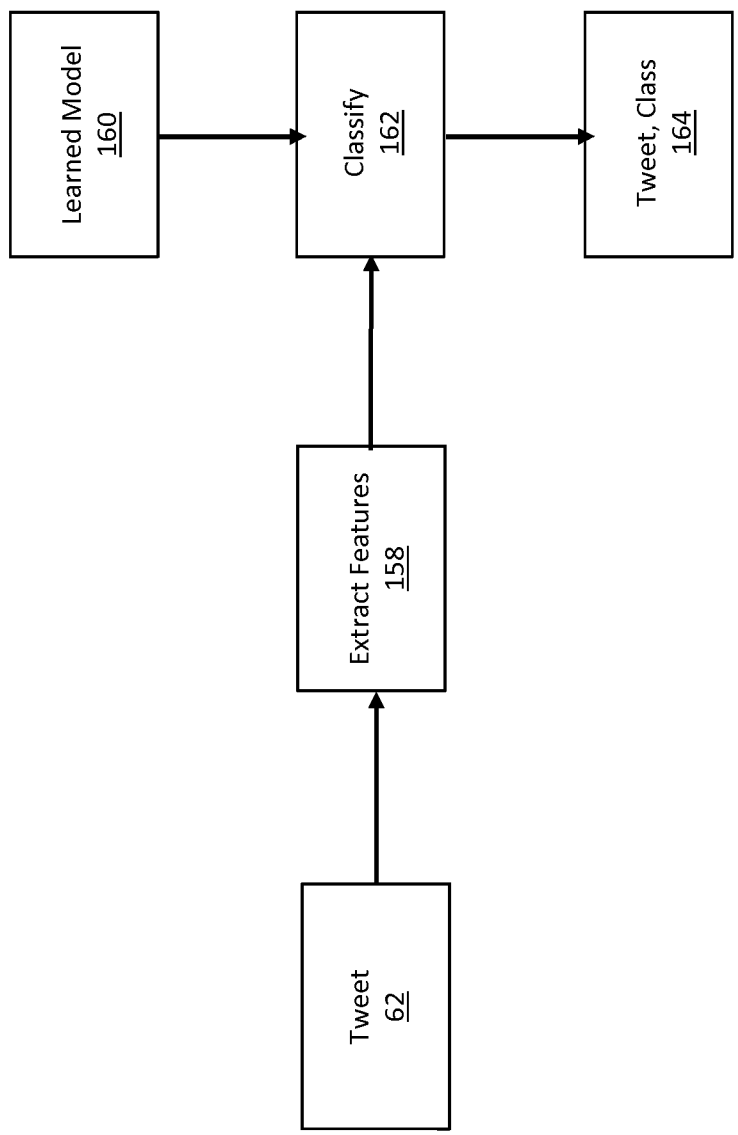
FIG. 10 is a flow diagram illustrating the process of a live system during storm classification in accordance with the present invention.

FIG. 10 is a flow diagram illustrating the process 158 of a live system during storm classification. At step 158, the microblogging storm engine 18 is configured to extract one or more features from each tweet. At step 160, the microblogging storm engine 18 is configured to apply a learning model to step 162 in which the microblogging storm engine 18 is configured to classify the type of tweet into a particular category of storm. At step 164, the microblogging storm engine 18 is configured to store the tweet and the classification of the associated tweet.

The web browser is a software application for retrieving, presenting, and traversing a URI on the World Wide Web provided by the cloud computer 166 or web servers. One common type of URI begins with Hypertext Transfer Protocol (HTTP) and identifies a resource to be retrieved over the HTTP. A web browser may include, but is not limited to, browsers running on personal computer operating systems and browsers running on mobile phone platforms. The first type of web browsers may include Microsoft's Internet Explorer, Apple's Safari, Google's Chrome, and Mozilla's Firefox. The second type of web browsers may include the iPhone OS, Google Android, Nokia S60, and Palm WebOS. Examples of a URI include a web page, an image, a video, or other type of content.

The network 20 can be implemented as a wireless network, a wired network protocol or any suitable communication protocols, such as 3G (third-generation mobile telecommunications), 4G (fourth-generation of cellular wireless standards), long term evolution (LTE), 5G, a wide area network (WAN), Wi-Fi™ like wireless local area network (WLAN) 802.11n, or a local area network (LAN) connection (internetwork—connected to either WAN or LAN), Ethernet, Bluebooth™, high frequency systems (e.g., 900 MHz, 2.4 GHz, and 5.6 GHz communication systems), infrared, transmission control protocol/internet protocol (TCP/IP) (e.g., any of the protocols used in each of the TCP/IP layers), hypertext transfer protocol (HTTP), BitTorrent™, file transfer protocol (FTP), real-time transport protocol (RTP), real-time streaming protocol (RTS), secure shell protocol (SSH), any other communications protocol and other types of networks like a satellite, a cable network, or an optical network set-top box (STB).

In one embodiment, a cloud computer is a browser-based operating system communicating through an Internet-based computing network that involves the provision of dynamically scalable and often virtualized resources as a service over the Internet, such as iCloud® available from Apple Inc. of Cupertino, Calif., Amazon Web Services (IaaS) and Elastic Compute Cloud (EC2) available from Amazon.com, Inc. of Seattle, Wash., SaaS and PaaS available from Google Inc. of Mountain View, Calif., Microsoft Azure Service Platform (Paas) available from Microsoft Corporation of Redmond, Wash., Sun Open Cloud Platform available from Oracle Corporation of Redwood City, Calif., and other cloud computing service providers.

Some portions of the above description describe the embodiments in terms of algorithmic descriptions and processes, e.g. as with the description within FIGS. 1-10. These operations (e.g., the processes described above), while described functionally, computationally, or logically, are understood to be implemented by computer programs or equivalent electrical circuits, microcode, or the like. The computer programs are typically embedded as instructions that can be stored on a tangible computer readable storage medium (e.g., flash drive disk, or memory) and are executable by a processor, for example, as described in FIGS. 1-10. Furthermore, it has also proven convenient at times to refer to these arrangements of operations as modules, without loss of generality. The operations described and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to "an inclusive or" and "not to an exclusive or". For example, a condition A or B is satisfied by any one of the following: A is true (or present) and B is false (or not present), A is false (or not present) and B is true (or present), and both A and B are true (or present).

The terms "a" and "an," as used herein, are defined as one or more than one. The term "plurality," as used herein, is defined as two or more than two. The term "another," as used herein, is defined as at least a second or more.

The invention can be implemented in numerous ways, including as a process, an apparatus, and a system. In this specification, these implementations, or any other form that the invention may take, may be referred to as techniques. In general, the order of the connections of disclosed apparatus may be altered within the scope of the invention.

The present invention has been described in particular detail with respect to one possible embodiment. Those skilled in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory;

functions performed by a single system component may instead be performed by multiple components, and functions performed by multiple components may instead be performed by a single component.

An ordinary artisan should require no additional explanation in developing the methods and systems described herein but may nevertheless find some possibly helpful guidance in the preparation of these methods and systems by examining standard reference works in the relevant art.

These and other changes can be made to the invention in light of the above detailed description. In general, in the following claims, the terms used should not be construed to limit the invention to the specific embodiments disclosed in the specification and the claims, but should be construed to include all methods and systems that operate under the claims set forth herein below. Accordingly, the invention is not limited by the disclosure, but instead its scope is to be determined entirely by the following claims.

What is claimed and desired to be secured by Letters Patent of the United States is:

1. A computer-implemented method for analyzing social media events, comprising:
   gathering a plurality of social media data received from one or more social media sources, each social media data including a post;
   extracting one or more features associated with each social media data;
   identifying substantially similar features among the plurality of social media data;
   clustering the plurality of social media posts that share substantially similar features, thereby identifying one or more clustered features patterns; and
   detecting a burst of clustered social media posts that have similar characteristics, wherein the characteristics of each social media post are determined by the composition of the associated features;
   The detecting step comprises detecting the burst of clustered social media posts that have similar characteristics by the following equation:

$$\text{Storm}(P_j) = \begin{cases} 1 & \text{if } \sum_{i=1}^{n} g(f(T_i, P_j), \delta_j) \geq S_j^k \\ 0 & \text{otherwise} \end{cases}$$

Wherein, the symbol $T_i$ represents the vector representing tweet vector i, the symbol $P_j$ represents the pattern vector for pattern j, the symbol f represents function that computes the similarity score of a message tweet $T_i$ to a given reference pattern $P_j$, the symbol g represents a function that compares the similarity score, the result of f ($T_i$, $P_j$) of a message tweet $T_i$ and $P_j$, to a threshold di in order to create a counting score to determine if a group of messages $T_i$ comprise a storm, the symbol $S_j^k$ represents the pattern specific threshold (or storm threshold, or shape function threshold) learned after k−1 iteration, the symbol δ represents a threshold for similarity of tweet to a referenced pattern, γ $S_j^k$ and the symbol $\delta_j$ represents a pattern specific similarity threshold value.

2. The method of claim 1, wherein one of the feature patterns comprises extracting at least the first character of each token in the text to create an abbreviated sequence of characters.

3. The method of claim 1, wherein the burst of clustered social media posts is a function of the number of related social media posts within a time period.

4. The method of claim 1, wherein one of the feature patterns comprises clustering the plurality of social media posts based on the distance of a number of like matching characters divided by the length of the longer item of a compared pair in social media posts.

5. The method of claim 1, wherein one of the feature patterns comprises clustering the plurality of social media posts based on the number of matching tokens divided by the total number of unique tokens.

6. The method of claim 1, wherein one of the feature patterns comprises a threshold-based clustering mechanism where the threshold is used to group the storms into different categories; the threshold can be determined by learning or estimating in using previously grouped storms.

7. The method of claim 1, wherein one of the feature patterns is based on histogram analysis of the repeating phrases and the sentiment orientation in the plurality of social media posts.

8. The method of claim 1, wherein one of the feature patterns comprises re-tweeting at least one social media post in addition to the histogram analysis and sentiment orientation to identify whether the burst constitutes a real storm or a spam.

9. The method of claim 1, wherein one of the feature patterns comprises a sorted histogram of token prefix strings, the strings being created by taking the first character of each token appearing in a corpus and using a sorting algorithm to group like prefix tokens.

10. The method of claim 1, wherein each social media data is selected from a group consisting of a text, an image, a video, an audio, or any combination thereof.

11. The method of claim 1, wherein each social media data includes a multimedia file.

12. A computer program product comprising a non-transitory computer readable storage medium structured to store instructions executable by a processor, the instructions, when executed cause the processor to:
   gathering a plurality of social media data received from one or more social media sources, each social media data including a post;
   extracting one or more features associated with each social media data;
   identifying substantially similar features among the plurality of social media data;
   clustering the plurality of social media posts that share substantially similar features, thereby identifying one or more clustered feature patterns; and detecting a burst of clustered social media posts that have similar characteristics, wherein the characteristics of each social media post are determined by the composition of the associated features;
   The detecting step comprises detecting the burst of clustered social media posts that have similar characteristics by the following equation:

$$\text{Storm}(P_j) = \begin{cases} 1 & \text{if } \sum_{i=1}^{n} g(f(T_i, P_j), \delta_j) \geq S_j^k \\ 0 & \text{otherwise} \end{cases}$$

Wherein, the symbol $T_i$ represents the vector representing tweet vector i, the symbol $P_j$ represents the pattern vector for pattern j, the symbol f represents function that computes the similarity score of a message tweet Ti to a given reference pattern Pj, the symbol g represents a function that compares the similarity score, the result of f (Ti, Pj) of a message tweet Ti and Pj, to a threshold di in order to create a counting score to determine if a group of messages Ti comprise a storm, the symbol $S_j^k$ represents the pattern specific threshold (or storm threshold, or shape function threshold) learned after k−1 iteration, the symbol δ represents a threshold for similarity of tweet to a referenced pattern, γ $S_j^k$ and the symbol $δ_j$ represents a pattern specific similarity threshold value.

13. The computer program product of claim 12, wherein one of the feature patterns comprises extracting at least the first character of each token in the text to create an abbreviated sequence of characters.

14. The computer program product of claim 12, wherein the burst of clustered social media posts is a function of the number of related social media posts within a time period.

15. The computer program product of claim 12, wherein one of the feature patterns comprises clustering the plurality of social media posts based on the distance of a number of like matching characters divided by the length of the longer item of a compared pair in social media posts.

16. The computer program product of claim 12, wherein one of the feature patterns comprises clustering the plurality of social media posts based on the distance of a number of like matching characters divided by the length of the longer item of a compared pair in social media posts.

* * * * *